Figure 2:
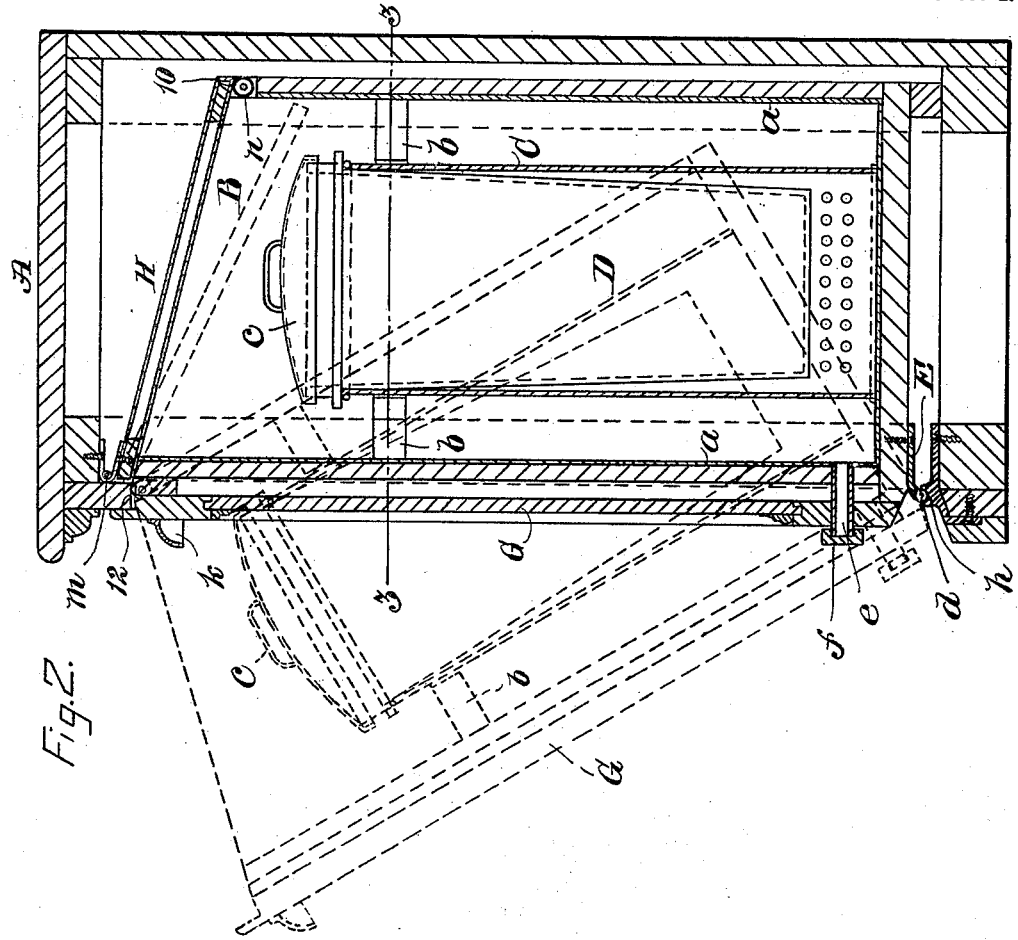

No. 688,210.  
Patented Dec. 3, 1901.
L. TUFTS & W. HELMER.
STORAGE RECEPTACLE FOR ICE CREAM.
(Application filed July 3, 1901.)
(No Model.)  
2 Sheets—Sheet 1.
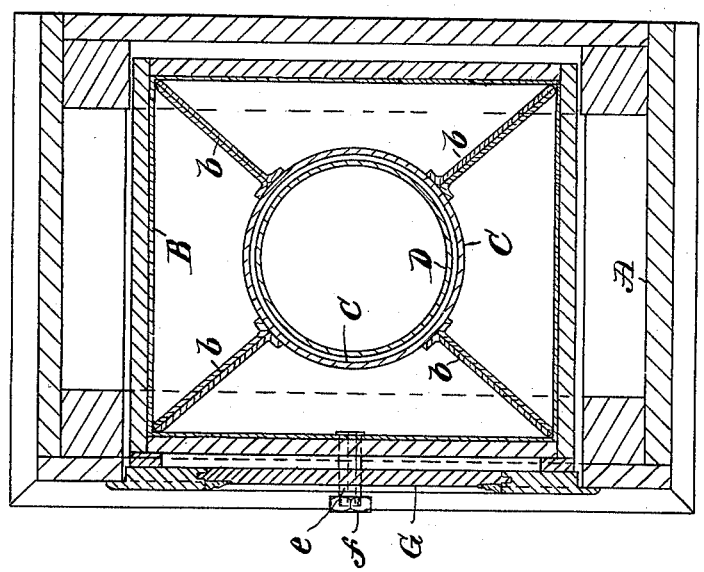
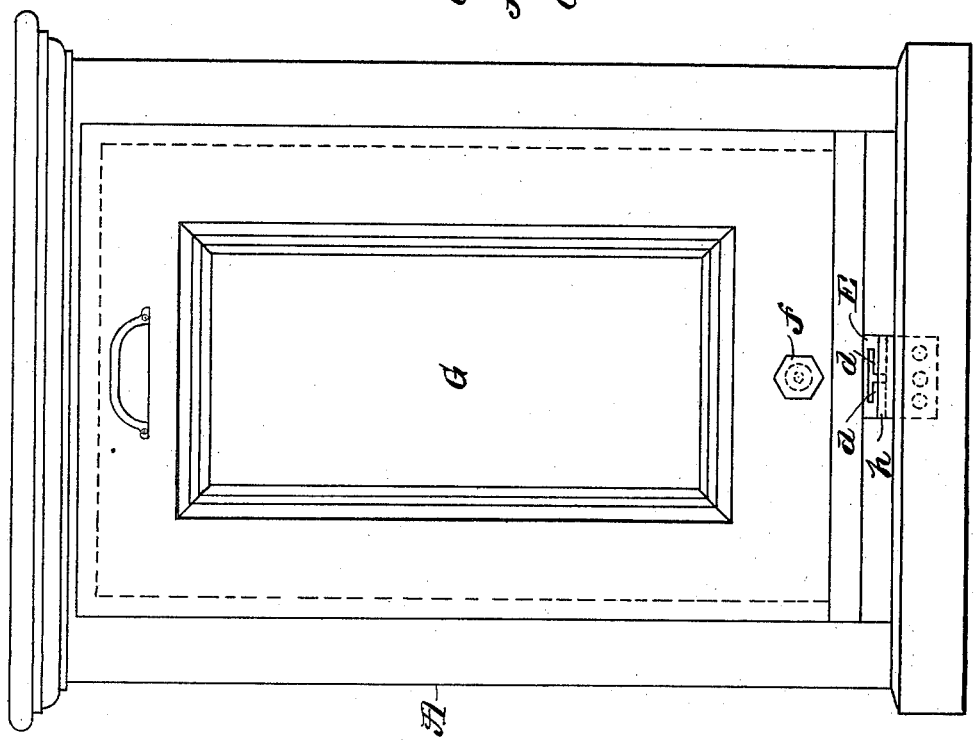
Witnesses.  
F. P. Spaulding  
Georgie Westwood
Inventors.  
Leonard Tufts  
William Helmer  
by P. E. Teschemacher  
Atty
THE NORRIS PETERS CO., PHOTO-LITHO., WASHINGTON, D. C.

No. 688,210. Patented Dec. 3, 1901.
L. TUFTS & W. HELMER.
STORAGE RECEPTACLE FOR ICE CREAM.
(Application filed July 3, 1901.)
(No Model.) 2 Sheets—Sheet 2.

Witnesses. Inventors.
F. P. Spaulding Leonard Tufts
George Westwood William Helmer
by Teschemacher
Atty

UNITED STATES PATENT OFFICE.

LEONARD TUFTS, OF MEDFORD, AND WILLIAM HELMER, OF BOSTON, MASSACHUSETTS, ASSIGNORS TO AMERICAN SODA FOUNTAIN COMPANY, OF JERSEY CITY, NEW JERSEY, A CORPORATION OF NEW JERSEY.

STORAGE-RECEPTACLE FOR ICE-CREAM.

SPECIFICATION forming part of Letters Patent No. 688,210, dated December 3, 1901.

Application filed July 3, 1901. Serial No. 67,062. (No model.)

*To all whom it may concern:*

Be it known that we, LEONARD TUFTS, of Medford, in the county Middlesex, and WILLIAM HELMER, of Boston, in the county of Suffolk, State of Massachusetts, citizens of the United States, have invented certain new and useful Improvements in Storage-Receptacles for Ice-Cream, of which the following is a specification.

Our invention has for its object to improve the construction of storage-receptacles for ice-cream used at soda-water counters and elsewhere in order to afford more convenient access to the ice-cream and enable the dispenser to more readily reach it for serving.

Further objects of our invention are to protect the ice-cream more effectually from the action of the external warm air, to economize space occupied by the receptacle, and to facilitate cleaning.

To these ends our invention consists in an ice-cream receptacle pivoted within a suitable support in such manner that it can be tilted into an oblique position, combined with means for retaining it in place when so tilted, as hereinafter fully described; and our invention also consists in certain novel features of construction and combinations of part hereinafter fully described and specifically claimed.

In the accompanying drawings, Figure 1 is a front elevation of an ice-cream receptacle constructed in accordance with our invention. Fig. 2 is a vertical section of the same. Fig. 3 is a horizontal section of the same on the line 3 3 of Fig. 2.

In the said drawings, A represents an outer supporting casing or cabinet having an open front and within which is placed the ice-cream-storage receptacle B, consisting of a box preferably provided with a suitable sheet-metal lining $a$ and adapted to contain the ice and salt, which are packed around a perforated sheet-metal cylinder C, which rests on the bottom of the box B and is held centrally within the same by means of radial arms $b$, extending out from said cylinder into contact with the inner walls of the box B. Within the cylinder C is placed the enameled-iron jar D for containing the ice-cream, said jar having a cover $c$. The open front of the cabinet A is closed by a door G, which is secured to the front side of the receptacle B and extends beyond the edges of the same, so as to overlap the edges of the front opening of the cabinet to form a tight joint, and thereby exclude the warm outer air. At the bottom of the box B and extending through the door G is a pipe $e$ for drawing off the ice-water, the outer end of said pipe being closed by a screw-cap $f$.

The box B is removably pivoted at its lower front edge, which is provided with a casting E, having trunnions or gudgeons $d$, fitting into open sockets in a plate $h$, secured to the bottom of the cabinet-front, whereby the box may be swung or tilted outward at an angle from the cabinet into the position shown in dotted lines in Fig. 2, in which position it is retained by the contact of the edge 10 of the box B with the edge 12 of the upper front portion of the cabinet, which thus forms a stop for limiting the outward movement of the box B, which in this inclined position affords easy access to the ice-cream jar and enables the dispenser to conveniently reach it for serving, while it also facilitates the operation of cleaning and also the removal of the jar D and perforated cylinder C. The door G is provided with a pull or handle $k$, by means of which the box B and contents may be tilted outward on its pivots, and the socket-plate $h$ is so formed as to permit the pivots or trunnions $d$ to be lifted out therefrom when the box B is partly swung outward, in which position it may be removed from the cabinet for cleaning. The top of the box B is beveled or inclined downward from front to rear and is closed by a cover H, the front edge of which is hinged at $m$ to the inner side of the upper front portion of the cabinet, as shown in Fig. 2, while the rear upper edge of the box is provided with antifriction-rollers $n$, which run in contact with the undersurface of the cover H to lessen the friction between said cover and the box when the latter is tilted forward on its pivots for the purpose of affording access to its contents.

What we claim as our invention, and desire to secure by Letters Patent, is—

1. An ice-cream receptacle comprising an outer casing or cabinet, an outwardly-swinging storage-receptacle provided at its bottom with a drainage-outlet and pivotally connected at its lower front edge with the cabinet and provided with a handle, a stop for limiting the outward movement of said swinging receptacle, a cover hinged at its front edge to the front of the cabinet and resting on the top of the swinging receptacle, a metal cylinder provided with perforations and having radial arms extending outwardly into contact with the interior walls of the swinging storage-receptacle, and an ice-cream jar fitting within said metal cylinder, substantially as described.

2. An ice-cream receptacle comprising an outer casing or cabinet, an outwardly-swinging storage-receptacle provided at its bottom with a drainage-outlet and pivotally connected at its lower front edge with the cabinet and having a door secured to its front side for closing the open front of said cabinet, said door being provided with a handle, a stop for limiting the outward movement of said swinging receptacle, a metal cylinder provided with perforations and having radial arms extending outwardly into contact with the interior walls of the swinging storage-receptacle, and an ice-cream jar fitting within said metal cylinder, substantially as described.

Witness our hands this 28th day of June, A. D. 1901.

LEONARD TUFTS.
WILLIAM HELMER.

In presence of—
GEORGE A. SWEETSER,
JOHN MACKSEY.